US 9,354,669 B2

(12) United States Patent
Chen et al.

(10) Patent No.: US 9,354,669 B2
(45) Date of Patent: May 31, 2016

(54) ELECTRONIC DEVICE

(71) Applicant: Acer Incorporated, New Taipei (TW)

(72) Inventors: Hung-Chi Chen, New Taipei (TW);
Iou-Ren Su, New Taipei (TW);
Cheng-Mao Chang, New Taipei (TW);
Yi-Chang Yeh, New Taipei (TW)

(73) Assignee: Acer Incorporated, New Taipei (TW)

( * ) Notice: Subject to any disclaimer, the term of this patent is extended or adjusted under 35 U.S.C. 154(b) by 146 days.

(21) Appl. No.: 14/449,163

(22) Filed: Aug. 1, 2014

(65) Prior Publication Data

US 2015/0062793 A1 Mar. 5, 2015

(30) Foreign Application Priority Data

Sep. 2, 2013 (TW) .............................. 102131582 A

(51) Int. Cl.
*G06F 1/16* (2006.01)

(52) U.S. Cl.
CPC ............ *G06F 1/1681* (2013.01); *G06F 1/1662* (2013.01); *G06F 1/166* (2013.01); *G06F 1/1616* (2013.01)

(58) Field of Classification Search
CPC ...... G06F 1/166; G06F 1/1616; G06F 1/1681
USPC .......................... 361/679.12, 679.21, 679.27, 361/679.42–679.44, 679.46, 679.55, 361/679.57, 679.59, 690, 724
See application file for complete search history.

(56) References Cited

U.S. PATENT DOCUMENTS

| | | | | |
|---|---|---|---|---|
| 5,552,960 A * | 9/1996 | Nelson | ............. | G06F 1/203 165/104.33 |
| 6,053,589 A * | 4/2000 | Lin | ............. | G06F 1/166 312/271 |
| 6,097,595 A * | 8/2000 | Cipolla | ............. | G06F 1/1616 248/685 |
| 6,930,881 B2 * | 8/2005 | Karidis | ............. | G06F 1/1616 16/286 |
| 7,566,043 B2 * | 7/2009 | Chen | ............. | G06F 1/166 248/188.2 |
| 2009/0147469 A1 * | 6/2009 | Chen | ............. | G06F 1/1616 361/679.55 |
| 2010/0127137 A1 * | 5/2010 | Wang | ............. | G06F 1/1616 248/188.6 |
| 2010/0232099 A1 * | 9/2010 | Wang | ............. | G06F 1/1616 361/679.01 |
| 2011/0292605 A1 * | 12/2011 | Chen | ............. | G06F 1/1616 361/695 |
| 2013/0229763 A1 * | 9/2013 | Guo | ............. | G06F 1/1637 361/679.27 |
| 2013/0249360 A1 * | 9/2013 | Guo | ............. | G06F 1/1681 312/223.2 |
| 2013/0308268 A1 * | 11/2013 | Tani | ............. | G06F 1/1681 361/679.57 |

* cited by examiner

*Primary Examiner* — Adrian S Wilson
*Assistant Examiner* — Abhishek Rathod
(74) *Attorney, Agent, or Firm* — Jianq Chyun IP Office

(57) ABSTRACT

An electronic device includes a first body, a second body, and a linking assembly. The first body has a first side and a second side opposite to each other, and a sliding slot located at the first side. The first body and the second body are pivoted to the linking assembly. The second body rotates relative to the first side of the first body to open or close and drives the linking assembly, such that the electronic device stands on a platform with the first side or the second side of the first body. The linking assembly has a supporting block movably coupled to the sliding slot. When the second body rotates to an angle relative to the first side, the supporting block protrudes out of the first side so that the electronic device stands on the platform with the first side.

13 Claims, 9 Drawing Sheets

ELECTRONIC DEVICE

CROSS-REFERENCE TO RELATED APPLICATION

This application claims the priority benefit of Taiwan application serial no. 102131582, filed on Sep. 2, 2013. The entirety of the above-mentioned patent application is hereby incorporated by reference herein and made a part of this specification.

BACKGROUND OF THE INVENTION

1. Field of the Invention

The invention relates to an electronic device and particularly relates to an electronic device having a supporting structure that is adjustable along with rotation of a body of the electronic device.

2. Description of Related Art

Computer is the most commonly used and most convenient tool for the modern life and work. A common desktop computer includes a monitor, a host, a keyboard, a mouse, a printer, and related peripherals. Since there is a variety of peripherals and the desktop computer is not easy to install and only suitable for use at fixed locations, it cannot be carried about. By contrast, notebook computers that have advantages in portability and easy use come in handy.

Most of the current notebook computers are the folding type and are provided with screens and operating interfaces. In addition, due to the progress of touch control technology, touch screens are also used as the operating interfaces for inputting signals, allowing the user to directly input operating signals by touching the screens. However, the folding structure is inconvenient for touch operations on the screens and may cause some problems, e.g. the screens may sway easily when being touched. Therefore, some manufacturers further develop a structure for folding the notebook computer 360 degrees to be stacked on the host, such that the user can operate the notebook computer as a tablet computer. However, when the touch screen of the notebook computer is folded 360 degrees and stacked on the host, the keyboard module of the notebook computer is on the side that may be placed on a platform, which may easily result in problems, such as inadvertent touching or wear. Therefore, how to provide a favorable touch environment after the screen is folded on the notebook computer and effectively prevent the aforementioned problems have become issues that need to be solved.

SUMMARY OF THE INVENTION

The invention provides an electronic device, wherein a body of the electronic device includes a supporting structure that is adjustable along with rotation of the body, so as to stand the electronic device on a platform with an opposite side of the body.

The electronic device of the invention includes a first body, a second body, and a linking assembly. The first body has a first sliding slot, a first side, and a second side, wherein the first side and the second side are opposite to each other, and the first sliding slot is located on the first side. The first body and the second body are pivoted to the linking assembly respectively. The second body is rotated to open or close between the first side and the second side of the first body by means of the linking assembly and drives the linking assembly, such that the electronic device stands on the platform with the first side or the second side of the first body. The linking assembly includes a supporting block that is movably coupled to the first sliding slot. When the second body is unfolded to an angle relative to the first side of the first body, a portion of the supporting block protrudes out of the first side, so as to stand the electronic device on the platform with the first side.

Based on the above, in the above embodiments of the invention, the linking assembly provides the electronic device a foot pad structure for supporting the first body. That is, when the electronic device stands on the platform with the second side, the supporting block is received inside the sliding slot of the first body corresponding to the current body state. When the second body is rotated to a specific angle relative to the first body, the linking assembly is driven by the body to move the supporting block out of the sliding slot to protrude out of the first side of the first body, such that the electronic device may stand on the platform with the first side or the second side, as required by the user, to provide a use mode that is convenient for the user and simultaneously protect components on the first body.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
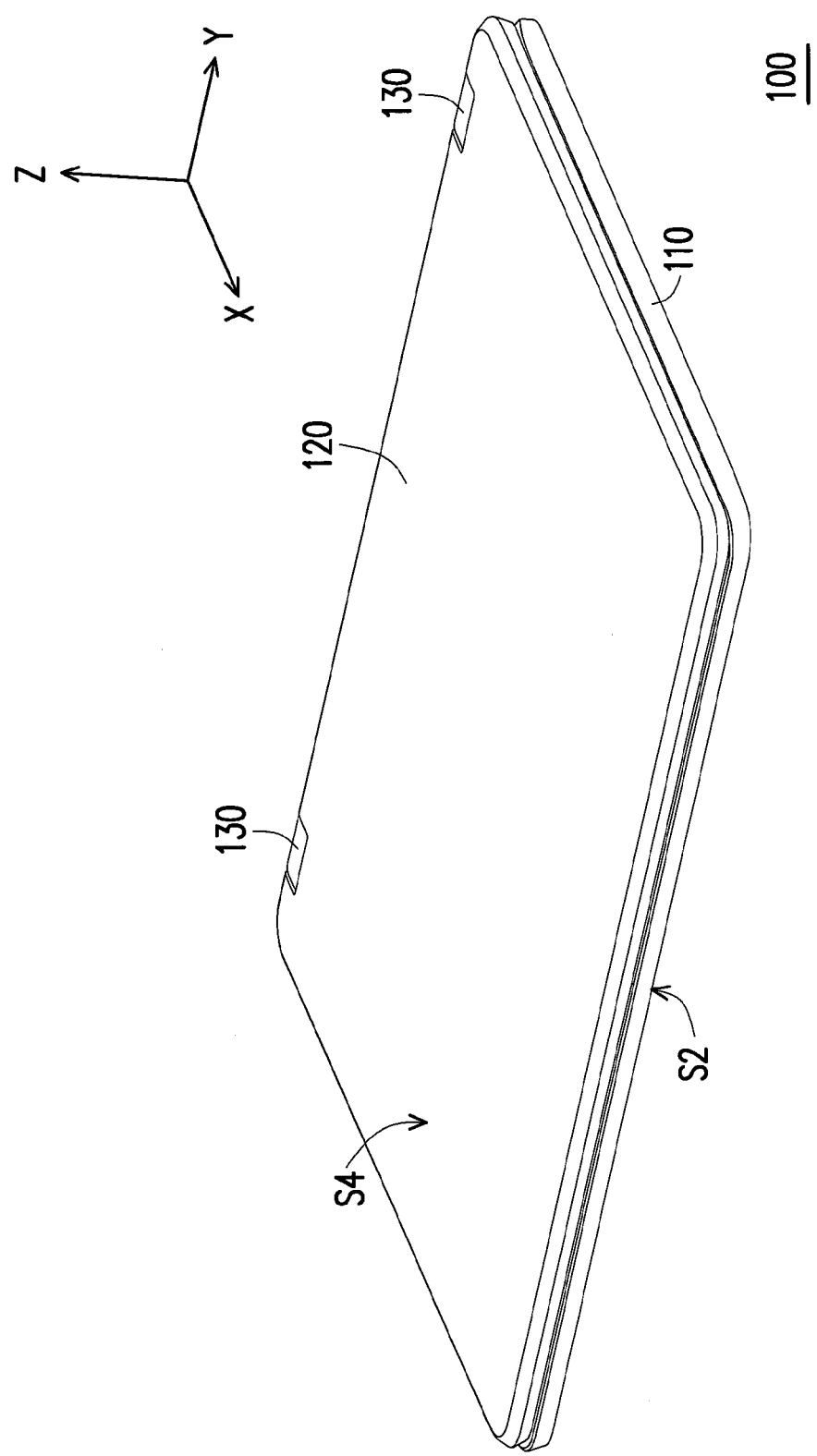
FIG. 1 is a schematic view of an electronic device according to an embodiment of the invention.
Figure 2:
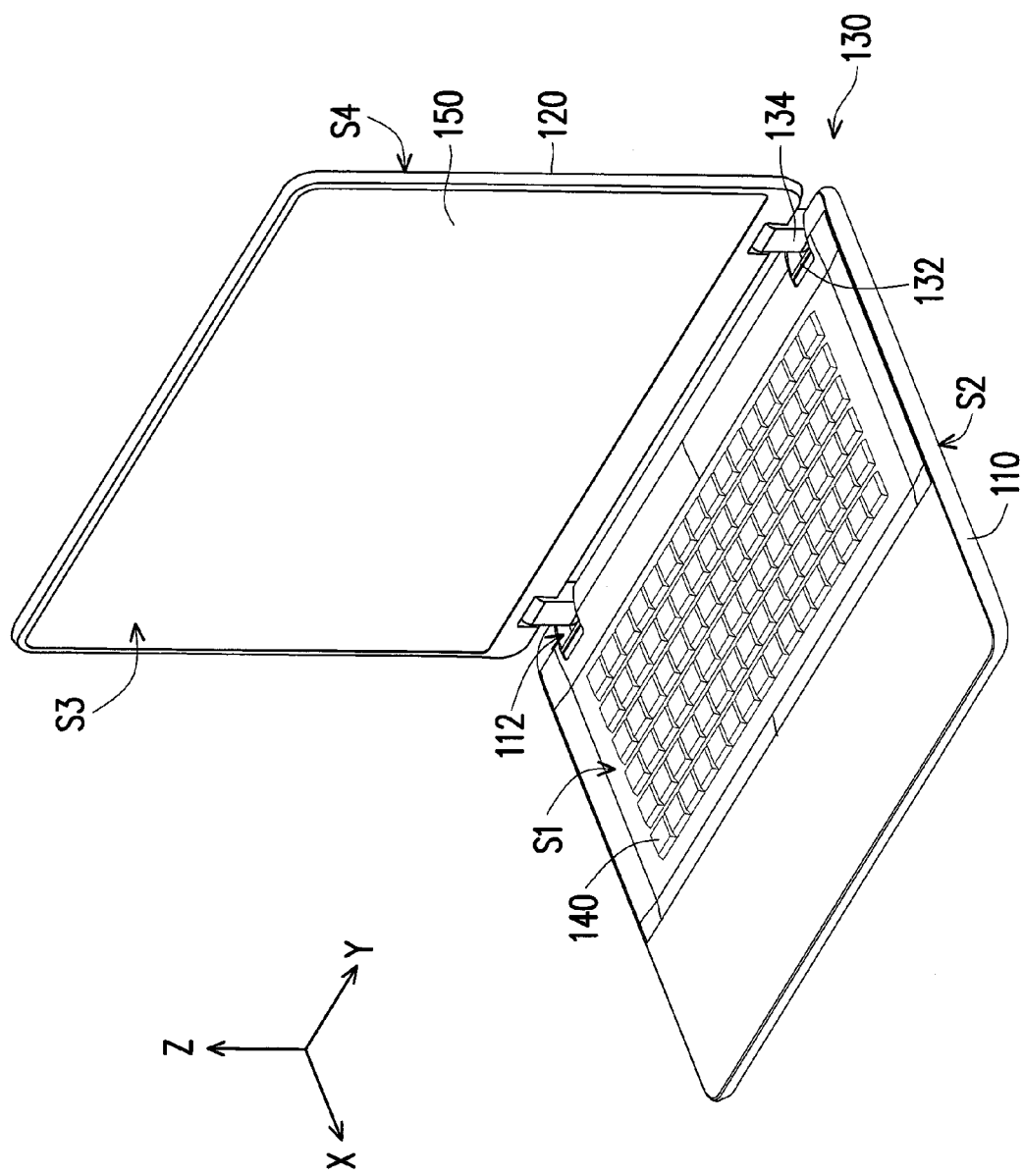
FIG. 2 to FIG. 5 are schematic views showing different states of the electronic device of FIG. 1.
Figure 3:
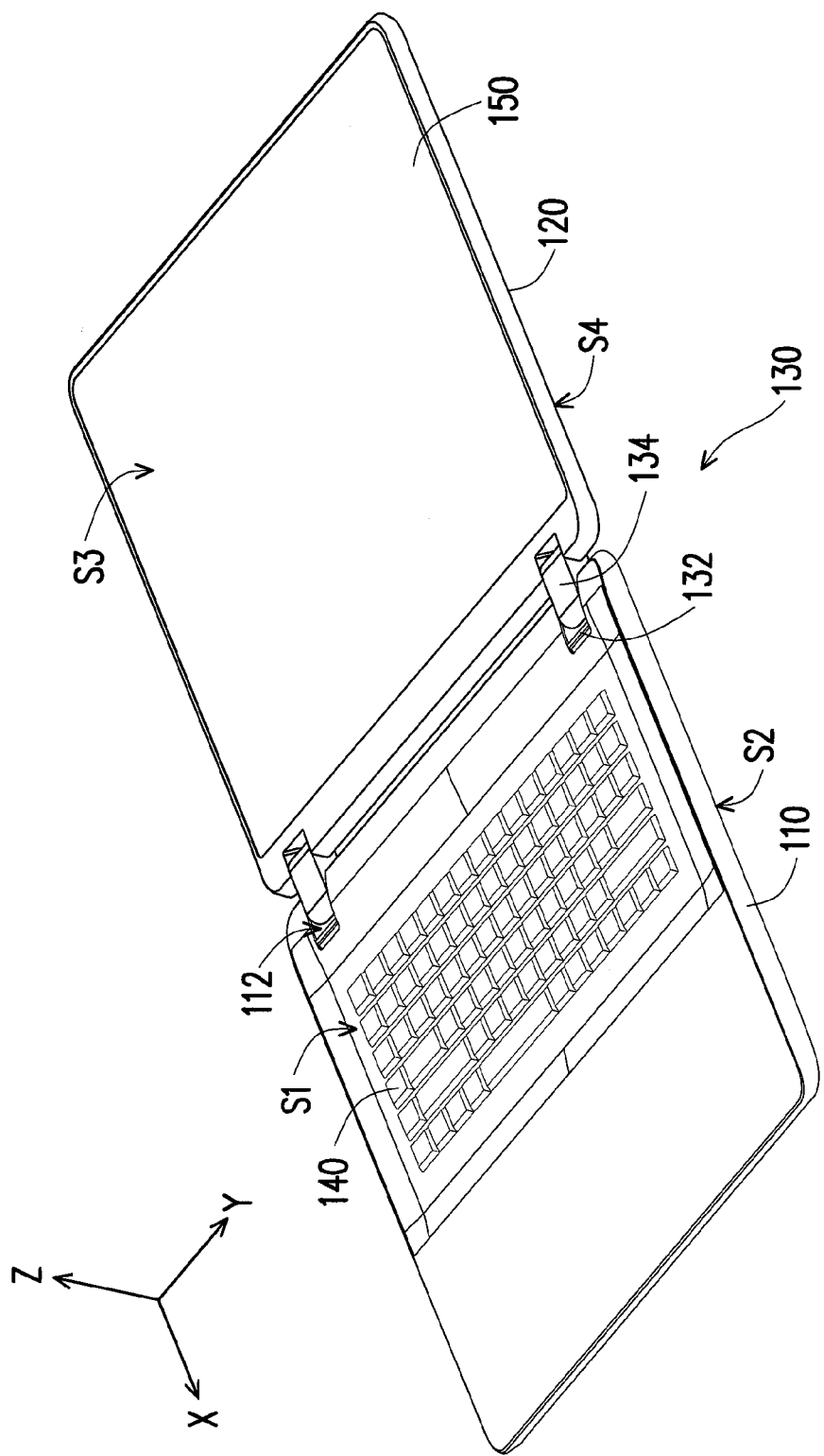
Figure 4:
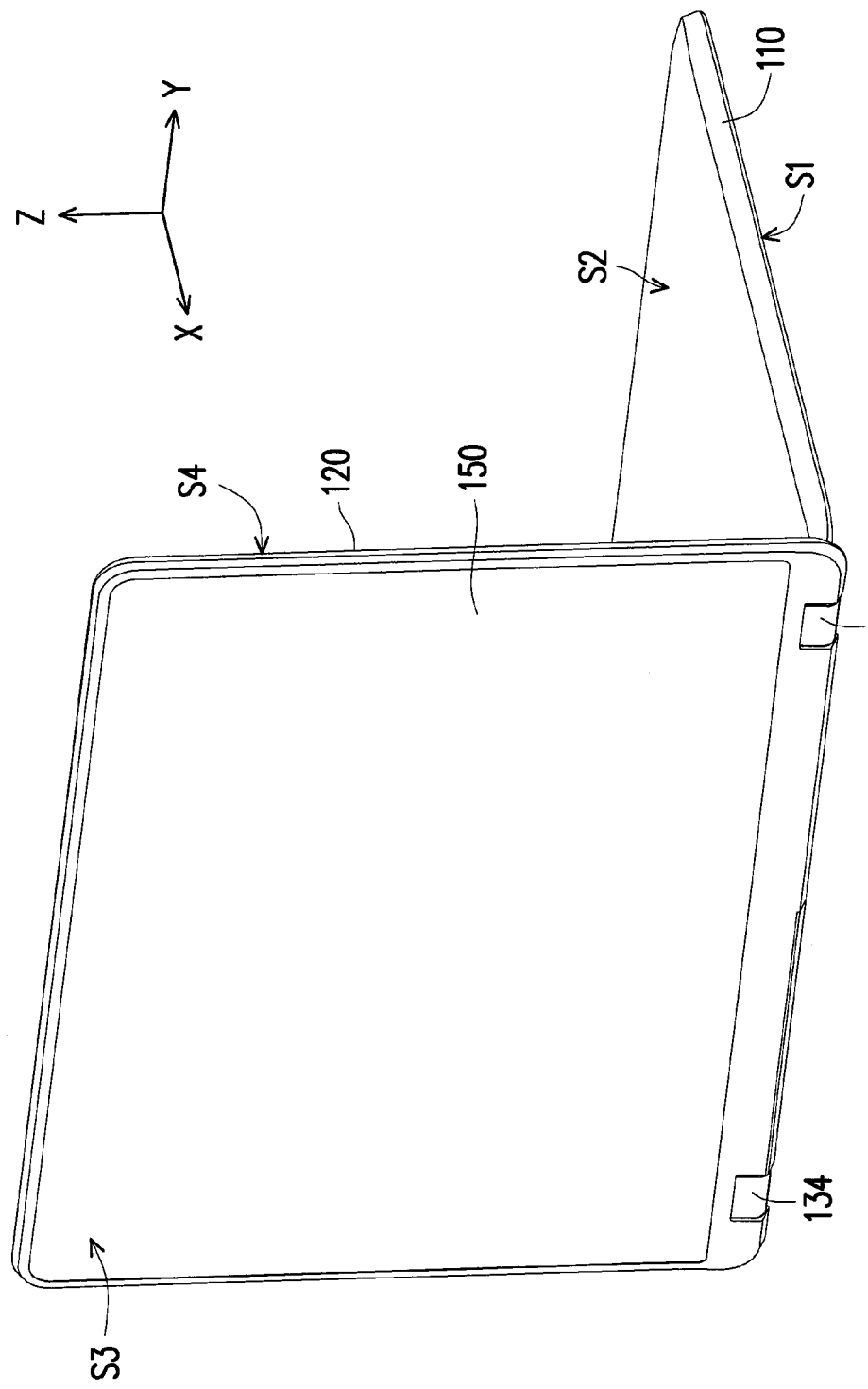

FIG. 1 is a schematic view of an electronic device according to an embodiment of the invention. With reference to FIG. 1, an electronic device 100 is a notebook computer, for example, which includes a first body 110 and a second body 120. The first body 110 and the second body 120 are pivoted to be rotatable relative to a Y axis. The first body 110 has a first side S1 and a second side S2 that are opposite to each other, wherein a keyboard module 140 is disposed on the first side S1. The second body 120 has a third side S3 and a fourth side S4, and a touch screen 150 is disposed on the third side S3.

Figure 5:
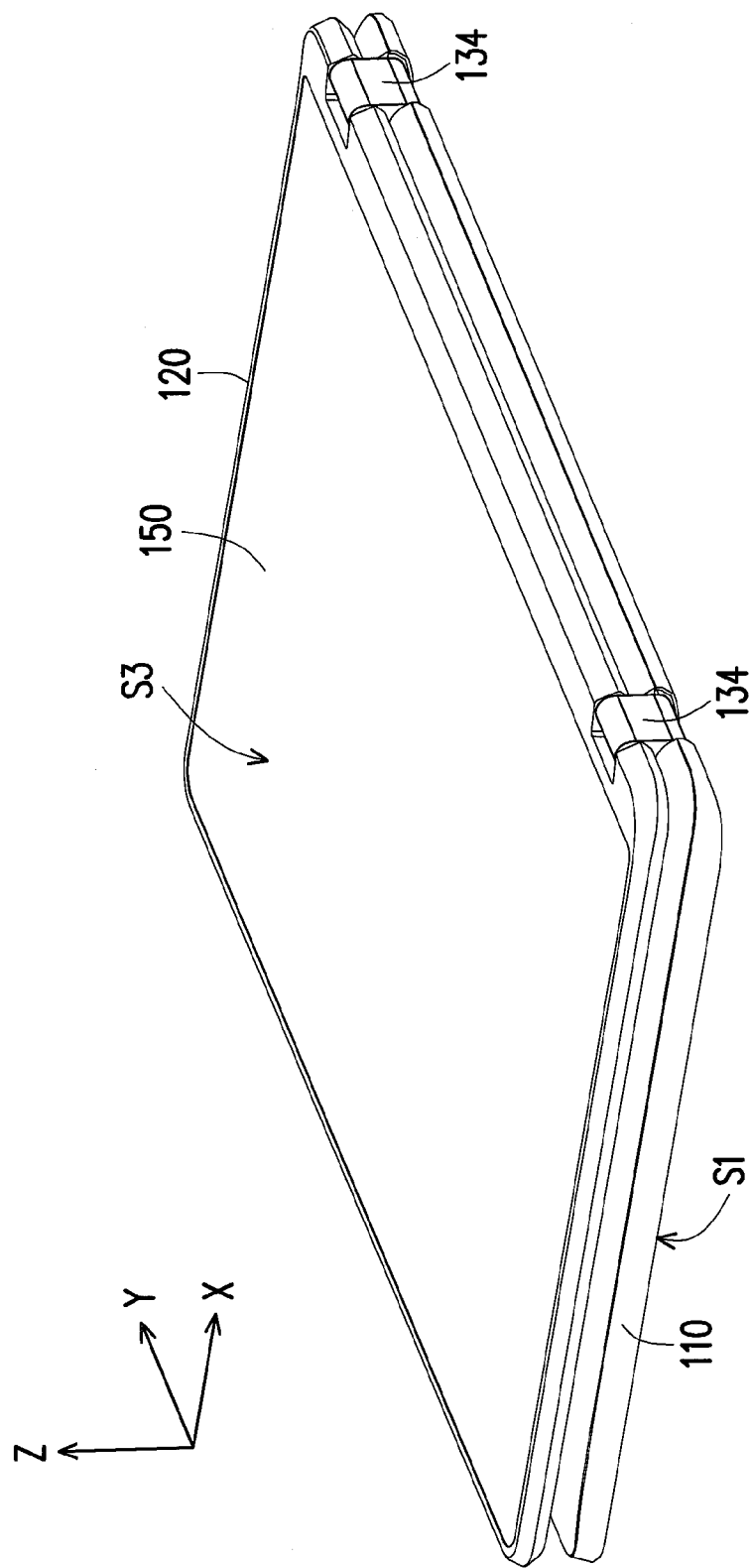
Figure 6:
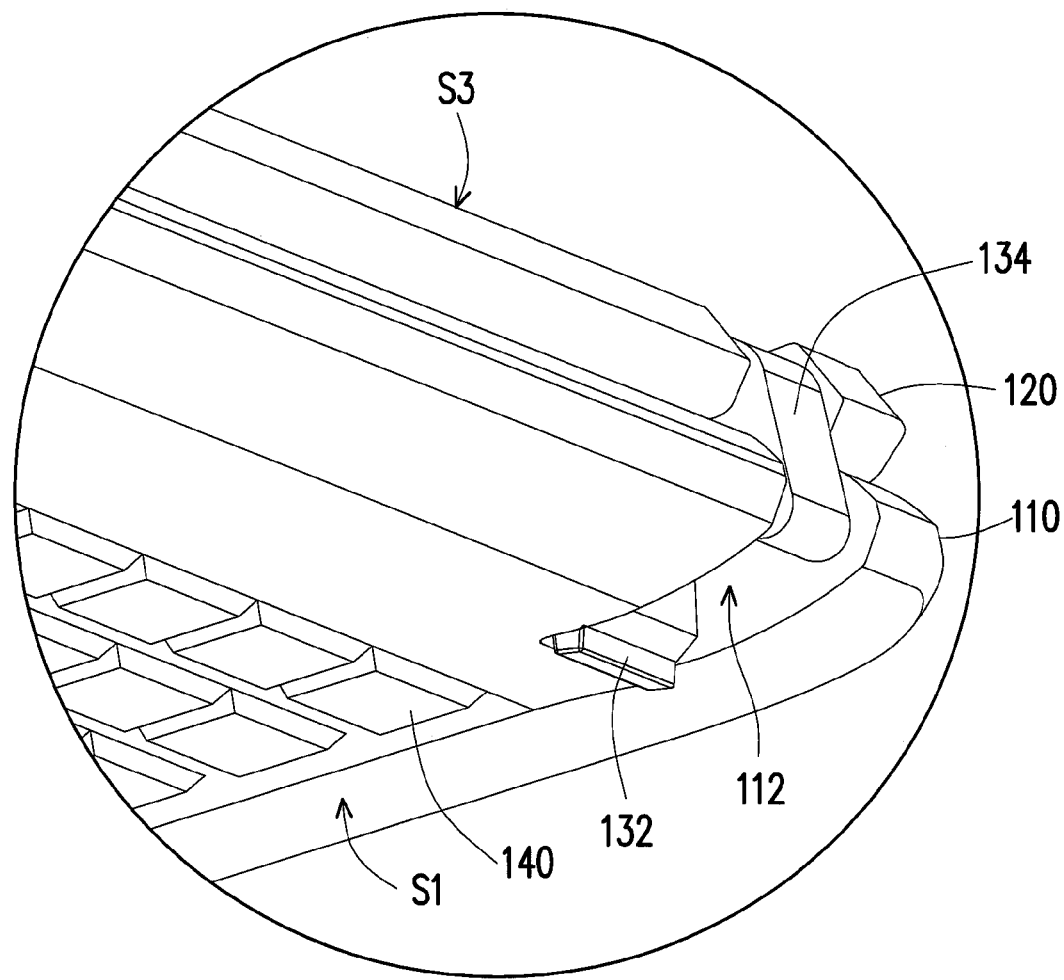
FIG. 6 is a schematic view of the electronic device of FIG. 5 from another perspective.

FIG. 2 to FIG. 5 are schematic views showing different states of the electronic device of FIG. 1, for illustrating different angles of rotation of the second body 120 relative to the first body 110. FIG. 6 is a schematic view of the electronic device of FIG. 5 from another perspective, in which the electronic device 100 of FIG. 5 is observed from below. To make the following descriptions of the relevant components more comprehensible, a rotation angle of FIG. 1 is defined as 0 degree, and the rotation angles of FIG. 2 to FIG. 5 are defined as 90 degrees, 180 degrees, 270 degrees, and 360 degrees respectively. Further, FIG. 7 to FIG. 11 are schematic cross-sectional views showing a portion of the electronic device corresponding to FIG. 1 to FIG. 5, which respectively illustrate relative positions of the components in the corresponding state. In FIG. 7 to FIG. 11, different hatchings are used to represent different components.

Figure 7:
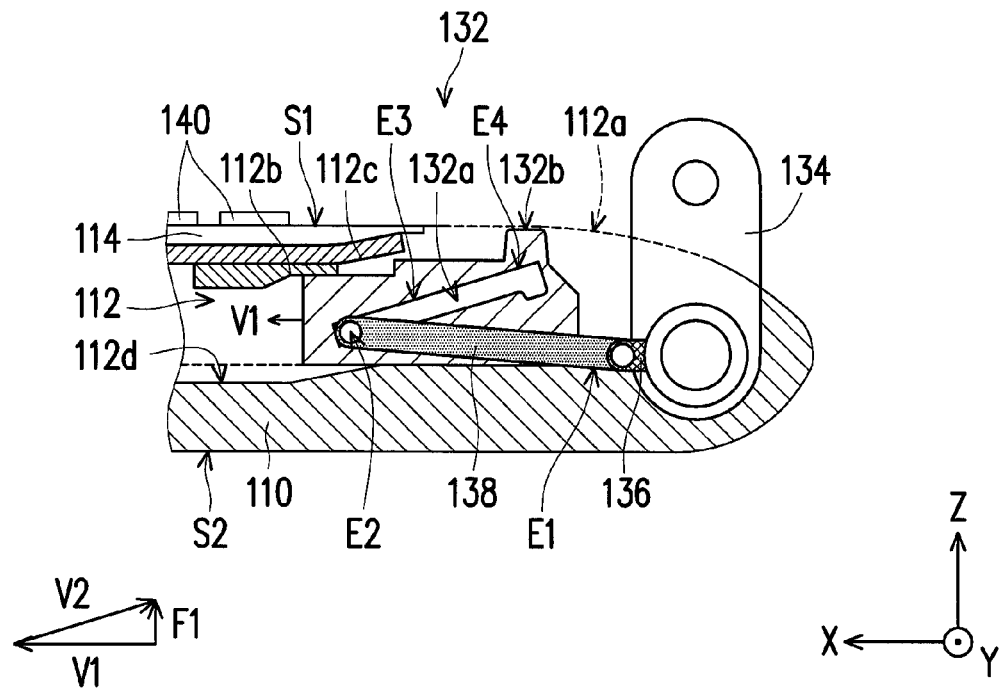
FIG. 7 to FIG. 11 are schematic cross-sectional views showing a portion of the electronic device corresponding to FIG. 1 to FIG. 5.
Figure 8:
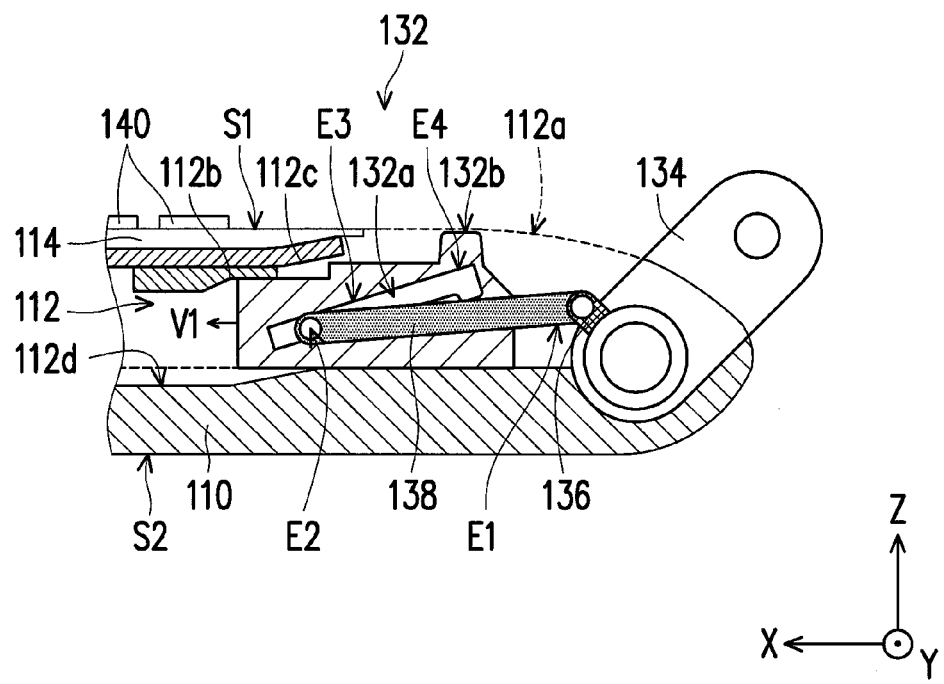
Figure 9:
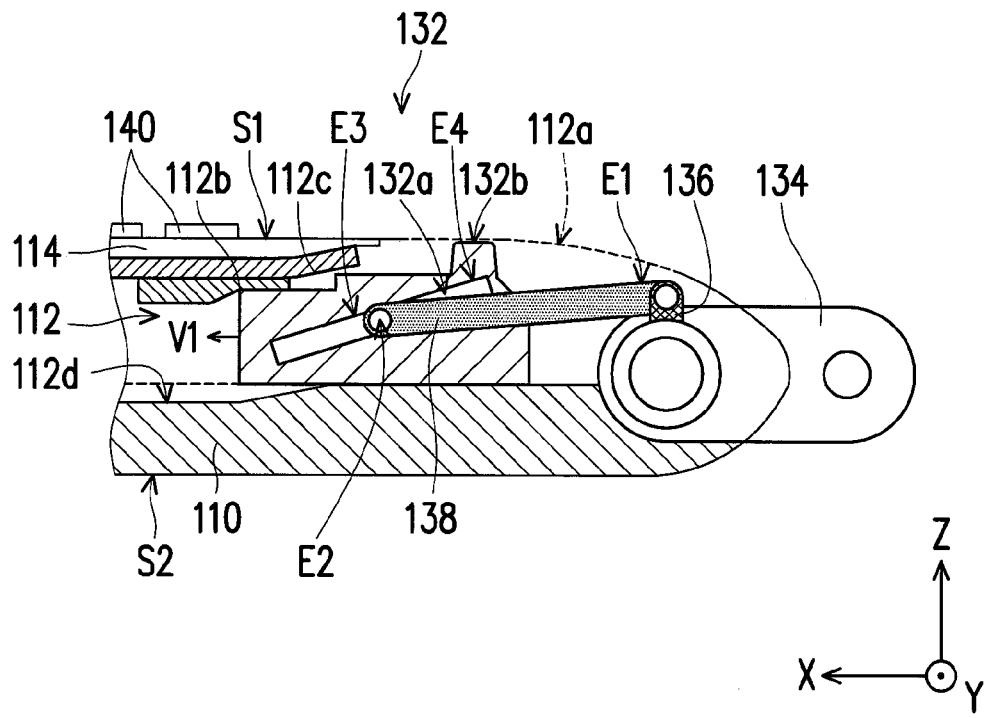
Figure 10:
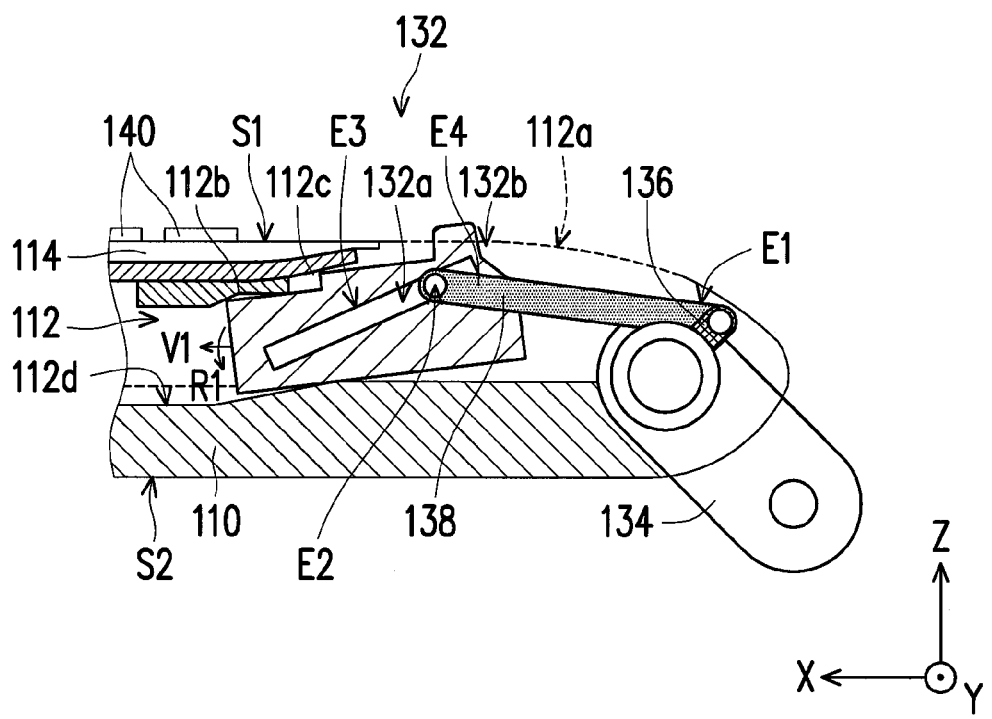

First, referring to FIG. 1 and FIG. 7, in this embodiment, the electronic device 100 further includes two linking assemblies 130. Since the two linking assemblies 130 have the same structure, the following will describe only one of the linking assemblies 130 for illustrative purpose. As shown in FIG. 1, the linking assembly 130 is connected between the first body 110 and the second body 120. More specifically, the linking assembly 130 includes a supporting block 132, a hinge 134, a first rod 136, and a second rod 138, wherein the first body 110 and the second body 120 are respectively pivoted to the hinge 134. In other words, the hinge 134 of this embodiment is a biaxial hinge for pivoting the first body 110 and the second body 120 respectively on the hinge 134, wherein the first body 110 and the second body 120 are rotated in parallel to each other (also in parallel to the Y axis in the figure) but around two different axial directions (not overlapping). Accordingly, the second body 120 may be rotated to open or close between the first side S1 and the second side S2 of the first body 110 by means of the hinge 134 of the linking assembly 130 and at the same time drives the linking assembly 130. On the other hand, when the user applies a force on the second body 120 (i.e. the first body 110 is in a fixed state), the hinge 134 achieves an effect of pivoting the second body 120 relative to the first body 110 and simultaneously causes the second body 120 to drive the hinge 134 to pivot relative to the first body 110.

In addition, it is worth mentioning that the aforementioned "may be rotated to open or close" refers to a rotation effect generated by pivoting the first body 110 and the second body 120 to different portions of the linking assembly 130, by which the second body 120 may be closed on the first side S1 of the first body 110 (in other words, the second body 120 is in an unfolded state relative to the second side S2 of the first body 110) or be closed on the second side S2 of the first body 110 (that is, the second body 120 is in an unfolded state relative to the first side S1 of the first body 110).

Moreover, the first body 110 further includes a first sliding slot 112 adjacent to the hinge 134, and the supporting block 132 is movably coupled to the first sliding slot 112. The supporting block 132 has a second sliding slot 132a and a protrusion 132b located above the second sliding slot 132a. The first rod 136 is fixed on the hinge 134. The second rod 138 has a first end E1 and a second end E2 that are opposite to each other, wherein the first end E1 is pivoted to the first rod 136, and the second end E2 is slidably coupled to the second sliding slot 132a of the supporting block 132. Accordingly, when the second body 120 receives a force to rotate and drive the hinge 134, the hinge 134 moves the first rod 136 and the second rod 138 and causes the second end E2 of the second rod 138 to slide back and forth along the second sliding slot 132a of the supporting block 132 and at the same time drive the supporting block 132 to move back and forth along the first sliding slot 112.

To be more specific, with reference to FIG. 7 again, the first body 110 further includes a top plate 114 located on the first side S1, wherein the keyboard module 140 is disposed on the top plate 114, and the first sliding slot 112 is disposed under the top plate 114 and extends divergently along an X axis. The first sliding slot 112 forms an opening 112a on the first side S1, and the opening 112a is located between the top plate 114 and the hinge 134. When a rod set, formed by the first rod 136 and the second rod 138, is driven by the rotation of the hinge 134, the second end E2 of the second rod 138 applies a force F1 to the supporting block 132. Further, an included angle exists between an extending direction of the second sliding slot 132a of the supporting block 132 and the force F1 (that is, the force F1 is not parallel to nor perpendicular to the second sliding slot 132a), and another included angle exists between an extending direction of the first sliding slot 112 and the extending direction of the second sliding slot 132a (that is, the first sliding slot 112 and the second sliding slot 132a are not parallel to nor perpendicular to each other). In addition, the supporting block 132 is also restricted by a contour of the first sliding slot 112. Thus, the force F1 that the second end E2 of the second rod 138 applies to the supporting block 132 only causes the supporting block 132 to slide along the X axis. A small diagram is provided beside the components of this embodiment depicted in FIG. 7 to illustrate directions of the applied force and movements of the relevant components. As shown in FIG. 7, the second rod 138 is driven to apply the force F1 to the supporting block 132 in a vertical direction. Due to the included angle between the second sliding slot 132a and the force F1, as shown in the figure, the second end E2 of the second rod 138 is restricted to slide along the second sliding slot 132a (i.e. a direction V2 in the figure), and ultimately causes the supporting block 132 to slide away from the hinge 134 in the first sliding slot 112 in a direction V1.

To be more specific, the first sliding slot 112 has a contour that expands gradually. That is, the contour of the first sliding slot 112 gradually expands in a negative X-axis direction (i.e. toward the hinge 134). A recess 112d is formed opposite to a position of the hinge 134 (i.e. inside the first sliding slot 112). Thus, as the supporting block 132 moves away from the hinge 134, the supporting block 132 gradually generates a rotational motion due to a change of the contour of the first sliding slot 112, and causes the protrusion 132b above the second sliding slot 132a to protrude out of the first side S1 of the first body 110 through the opening 112a. Below motion of the supporting block 132 is explained in detail with reference to an interaction between the first body 110 and the second body 120.

In this embodiment, the first sliding slot 112 includes a guiding portion 112b and a blocking portion 112c. The recess 112d is formed below the guiding portion 112b and opposite to the aforementioned gradually expanding contour. In other words, the first sliding slot 112 has the gradually expanding contour and the recess 112d that are opposite to each other on the X axis. On the X axis, the blocking portion 112c is located between the opening 112a and the guiding portion 112b. On a Z axis, the blocking portion 112c is located between the top plate 114 and the guiding portion 112b. In addition, the second sliding slot 132a of the supporting block 132 has a third end E3 and a fourth end E4 that are opposite to each other. When the electronic device 100 is in the state of FIG. 1 (i.e. FIG. 7), namely, an unfolded angle of the second body 120 relative to the first side S1 of the first body 110 is 0 degree, the second end E2 of the second rod 138 is located at the third end E3 of the second sliding slot 132a.

Then, in the transition of the states of the electronic device 100 from FIG. 1 to FIG. 3 and FIG. 7 to FIG. 9, the second body 120 is unfolded from the first side S1 of the first body 110 with the unfolded angle changing from 0 degree to 180 degrees. Meanwhile, the supporting block 132 is driven by the second rod 138 to slide away from the hinge 134 along the guiding portion 112b from the position shown in FIG. 7 to the position shown in FIG. 9, during which the supporting block 132 is restricted by the first sliding slot 112 and only moves horizontally along the X axis (as indicated by the direction V1 in the figure).

Figure 11:
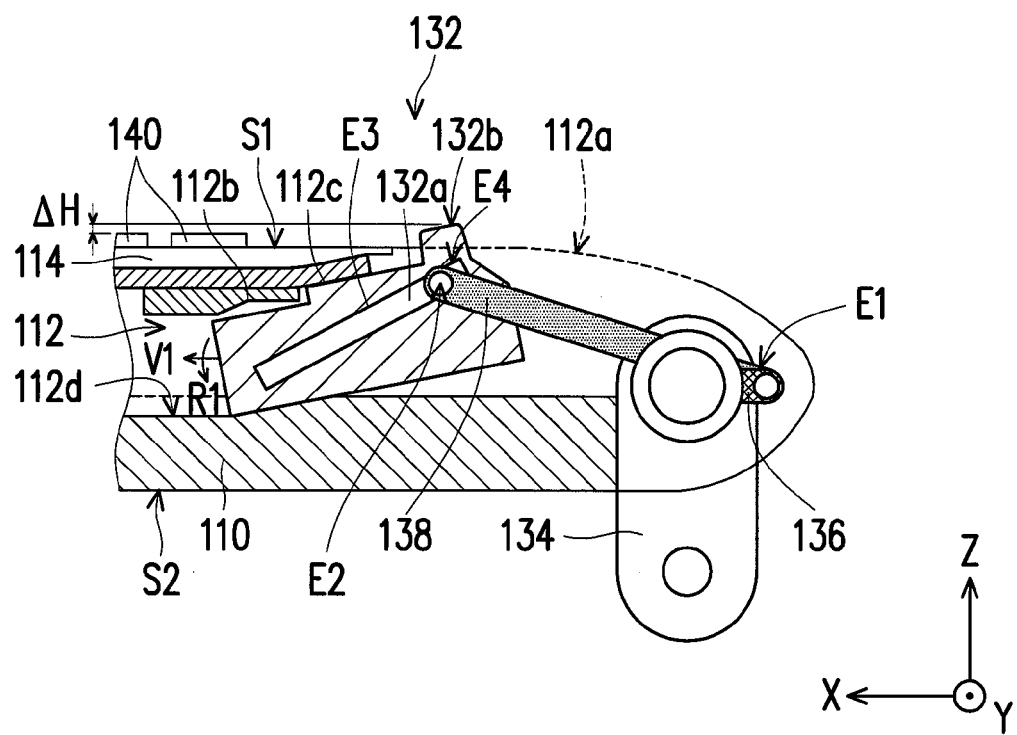

Next, referring to FIG. 4 to FIG. 6 and FIG. 10 to FIG. 11, as the second body 120 continues to pivot toward the second side S2 of the first body 110 and changes the unfolded angle from 180 degrees to 360 degrees until the second body 120 is folded on the second side S2 of the first body 110, the second rod 138 is rotated in a clockwise direction, as shown in the figure, until the second end E2 arrives at the fourth end E4 of the second sliding slot 132. Due to the gradually expanding contour of the first sliding slot 112 and the recess 112d on the opposite side, the contour that restricts the sliding of the supporting block 132 is widened gradually. Thus, the force F1 not only causes the supporting block 132 to slide along the direction V1 but at the same time rotates the supporting block 132 in a counterclockwise direction as shown in the figure (as indicated by a direction R1), so that a portion of the supporting block 132 falls into the recess 112d until the supporting block 132 is blocked by the blocking portion 112c of the first sliding slot 112. At the same time, the protrusion 132b of the supporting block 132 passes through the opening 112a to protrude out of the first side S1 of the first body 110. More importantly, as illustrated in FIG. 6 and FIG. 11, a height of the protrusion 132b that protrudes out of the first side S1 relative to the first side S1 is greater than a height of a top surface of the keyboard module 140 relative to the first side S1. That is to say, a height difference ΔH exists therebetween. Accordingly, the protrusion 132b may serve as a foot pad structure for supporting the first body 110 of the electronic device 100, and the first side S1 of the first body 110 serves as a rest structure for standing the electronic device 100 on a platform (i.e. an X-Y plane), so as to prevent direct contact between the keyboard module 140 on the first side S1 and the platform to effectively avoid inadvertent touching or damaging the keyboard module 140.

It needs to be mentioned that a length of the rod set (the first rod 136 and the second rod 138) and the included angle between the first sliding slot 112 and the second sliding slot 132a may be adjusted as required, such that a portion of the supporting block 132 (i.e. the protrusion 132b) may serve as a supporting foot pad when the unfolded angle of the electronic device 100 of this embodiment is over 180 degrees.

To sum up, in the above embodiments of the invention, the linking assembly provides the electronic device a foot pad structure for supporting the first body. That is, when the electronic device stands on the platform with the second side, the supporting block is received inside the sliding slot of the first body corresponding to the current body state. When the second body is rotated to a specific angle relative to the first body, the linking assembly is driven by the body to move the supporting block out of the sliding slot to protrude out of the first side of the first body, such that the electronic device may stand on the platform with the first side or the second side, as required by the user, to provide a use mode that is convenient for the user and simultaneously protect the components on the first body.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An electronic device, comprising:
    a first body comprising a first sliding slot, a first side, and a second side opposite to the first side, wherein the first sliding slot is located on the first side;
    a second body; and
    a linking assembly to which the first body and the second body are respectively pivoted, wherein the second body is rotated to open or close between the first side and the second side of the first body with the linking assembly and drives the linking assembly for the electronic device to stand on a platform with the first side or the second side of the first body, wherein the linking assembly comprises a supporting block movably coupled to the first sliding slot, and when the second body is unfolded to an angle relative to the first side of the first body, a portion of the supporting block protrudes out of the first side for the electronic device to stand on the platform with the first side;
    wherein the supporting block comprises a second sliding slot, and the linking assembly comprises:
    a hinge to which the first body and the second body are respectively pivoted,
    wherein the first sliding slot is adjacent to the hinge, and when the second body is rotated, the hinge is driven to rotate relative to the first body;
    a first rod fixed on the hinge; and
    a second rod comprising a first end and a second end opposite to each other,
    wherein the first end is pivoted to the first rod, the second end is coupled to the second sliding slot, and the second body is rotated and drives the first rod and the second rod through the hinge so as to cause the second end of the second rod to slide along the second sliding slot and drive the supporting block to move along the first sliding slot.

2. The electronic device according to claim 1, wherein the angle is greater than 180 degrees.

3. The electronic device according to claim 1, wherein an included angle exists between a direction of a force by which the second end drives the supporting block and
    an extending direction of the second sliding slot, and another included angle exists between an extending direction of the first sliding slot and the extending direction of the second sliding slot.

4. The electronic device according to claim 1, wherein the direction of the force by which the second end drives the supporting block is perpendicular to the extending direction of the first sliding slot.

5. The electronic device according to claim 1, wherein the first sliding slot comprises a gradually expanding contour toward the hinge and a recess located on a side opposite to the hinge.

6. The electronic device according to claim 1, wherein the first body comprises a top plate on the first side, and the first sliding slot forms an opening on the first side,
    wherein the opening is located between the top plate and the hinge, and a protrusion of the supporting block passes through the opening to protrude out of the first side.

7. The electronic device according to claim 6, wherein the first sliding slot comprises a guiding portion and a blocking portion located between the opening and the guiding portion, wherein the supporting block slides toward the hinge along the guiding portion of the first sliding slot and is blocked by the blocking portion after rotating relative to the guiding portion, so that the protrusion passes through the opening to protrude out of the first side.

8. The electronic device according to claim 1, wherein, when the angle is in a range of 0 to 180 degrees, the supporting block slides along the first sliding slot; and when the angle is in a range of 270 to 360 degrees, the supporting block slides and rotates relative to the first sliding slot.

9. The electronic device according to claim 8, wherein a rotation direction of the second rod is opposite to a rotation direction of the supporting block.

10. The electronic device according to claim 8, wherein the supporting block slides away from the hinge.

11. The electronic device according to claim 1, wherein the hinge is a biaxial hinge,
- by which the first body and the second body are rotated in parallel to each other but around different axial directions.

12. The electronic device according to claim 1, wherein the second sliding slot comprises a third end and a fourth end, wherein the second end of the second rod slides back and forth between the third end and the fourth end, and when the angle is 0 degree,
- the second end of the second rod is located at the third end; and when the angle is 360 degrees, the second end of the second rod moves to the fourth end.

13. The electronic device according to claim 1, further comprising:
- a keyboard module disposed on the first side of the first body, wherein when the portion of the supporting block protrudes out of the first side, a height of the portion of the supporting block relative to the first side is greater than a height of a top surface of the keyboard module relative to the first side.

\* \* \* \* \*